United States Patent [19]
Park

[11] Patent Number: 5,719,644
[45] Date of Patent: Feb. 17, 1998

[54] DATA COLLISION AVOIDANCE CIRCUIT USED IN AN IMAGE PROCESSING FIFO MEMORY

[75] Inventor: Ki-Bok Park, Suwon, Rep. of Korea

[73] Assignee: Samsung Electronics Co., Ltd., Kyungki-do, Rep. of Korea

[21] Appl. No.: 521,410

[22] Filed: Aug. 30, 1995

[30] Foreign Application Priority Data

Oct. 13, 1994 [KR] Rep. of Korea ............... 26243/1994

[51] Int. Cl.$^6$ ......................................... H04N 5/907
[52] U.S. Cl. ...................... 348/715; 348/513; 348/524; 348/718; 386/91
[58] Field of Search ............................. 348/513, 514, 348/524, 526, 571, 715, 718, 716; 358/320, 323, 337, 339; 360/36.1, 36.2; 386/13, 20, 85, 90, 91; H04N 5/907, 9/475

[56] References Cited

U.S. PATENT DOCUMENTS

| | | | |
|---|---|---|---|
| 4,775,899 | 10/1988 | Pasdera et al. | 360/36.2 |
| 4,797,743 | 1/1989 | Miyazaki | 348/513 |
| 4,862,269 | 8/1989 | Sonoda et al. | 348/514 |
| 4,975,788 | 12/1990 | Yamanishi | 360/36.2 |
| 5,220,312 | 6/1993 | Lumelsky et al. | 345/190 |
| 5,329,366 | 7/1994 | Kuroda | 348/571 |
| 5,453,885 | 9/1995 | Takeshita et al. | 386/91 |
| 5,646,700 | 7/1997 | Park | 348/718 |

FOREIGN PATENT DOCUMENTS

| | | | |
|---|---|---|---|
| 94-2793 | 2/1994 | Rep. of Korea | H04N 7/18 |
| 95-26291 | 9/1995 | Rep. of Korea | H04N 7/18 |

*Primary Examiner*—John K. Peng
*Assistant Examiner*—Jeffrey S. Murrell
*Attorney, Agent, or Firm*—Sughrue, Mion, Zinn, Macpeak & Seas, PLLC

[57] ABSTRACT

A data collision avoidance circuit is utilized in a memory write control circuit of an image signal processing apparatus for preventing the write and read clocks of a FIFO memory from colliding. The circuit contains a write enable signal generating unit, a window pulse section set up unit, and a write enable signal control unit. The write enable signal generating unit generates a write enable signal in response to the write control odd/even field signal to write the data into the FIFO memory. The window pulse section set up unit generates a window pulse signal having a predetermined pulse width. The time interval of the predetermined pulse width is designed to be greater than a time interval during which write and read clocks of the FIFO memory can potentially collide, and the window pulse signal is generated in response to a read control odd/even field signal. The write enable signal control unit is designed to suppress the write enable signal generated by the write enable signal generating unit in response to a predetermined edge of the write control odd/even field signal during the window pulse signal. As a result, the collision of the write and read clocks is prevented.

19 Claims, 4 Drawing Sheets

DATA COLLISION AVOIDANCE CIRCUIT USED IN AN IMAGE PROCESSING FIFO MEMORY

BACKGROUND OF THE INVENTION

The present invention relates to a control circuit for a FIFO (First In First Out) memory used in an image signal processing apparatus. In particular, the invention relates to a circuit for preventing the collision of new and old data when new data is written to and old data is read from the FIFO memory.

In general, data is respectively written to and read from a FIFO memory based on the timing of a write clock and a read clock. Moreover, if the timing of the write clock and the read clock of the FIFO memory overlap, data will be simultaneously read from and written to the memory, and the new data will collide with the old data.

In order to prevent the new data from colliding with the old data, data collision avoidance circuits are used to selectively suppress either the write clock or the read clock when the two clocks overlap. Generally, the write and read clocks for the FIFO memory can only potentially overlap during a predetermined range of clock cycles. For example, the write and read clock may potentially overlap between the 120th clock cycle and the 600th clock cycle. Accordingly, data collision avoidance circuits are used to generate a control signal which prevents either the read clock or the write clock from reading data from or writing data to the FIFO memory during the predetermined clock cycle range.

An example of a data collision avoidance circuit used to control a FIFO memory of an image signal processing apparatus is disclosed in the Korean Patent Application No. 94-2793 issued to the inventor of the present invention. This circuit sets the timing of the write and read clocks to prevent the write clock from causing data to be written to the FIFO memory between the 120th and 600th clock cycles. As a result, data can only be read from the FIFO memory, and any potential collision between the old and new data is prevented.

FIG. 1 illustrates a data collision avoidance circuit used in conjunction with a FIFO memory. As illustrated in the figure, the circuit has a memory write control circuit 10 for receiving an image data signal to be written to the FIFO memory. Based on the received signal, the control circuit 10 generates and outputs a write enable signal WE' to control the writing of the new data to the FIFO memory.

The data collision avoidance circuit also comprises a signal inverting unit 20 for receiving a write control odd/even field signal OE and a read control odd/even field signal FLDS. After receiving the signals OE and FLDS, the signal inverting unit 20 respectively inverts the signals OE and FLDS via two inverters IN1 and IN2. The inverted signals $\overline{OE}$ and $\overline{FLDS}$ are output to a differentiator 30 which comprises four condensers C1 to C4 and four resistors R1 to R4 for differentiating the inverted signals $\overline{OE}$ and $\overline{FLDS}$ into differentiated signals TRG1 and TRG2.

Subsequently, the differentiated signals TRG1 and TRG2 are output to a first monostable multivibrator MM1 of a write/read clock comparator 40. Each time one of the differentiated signals TRG1 and TRG2 is received, the first monostable multivibrator MM1 outputs a pulse signal having a pulse width which is determined by the values of a resistor R5 and a condenser C5. The output the first monostable multivibrator MM1 is coupled to a second monostable multivibrator MM2, and each time second monostable multivibrator MM2 inputs the pulse signal from the first monostable multivibrator MM1, the multivibrator MM2 outputs a pulse signal having a pulse width which is determined by the values of a resistor R6 and a condenser C6.

The write/read clock comparator 40 also comprises a NAND gate NAND1 which is coupled to the output terminals of the first and second monostable multivibrators MM1 and MM2. The NAND gate NAND1 NANDs the pulse signals output from the first and second monostable multivibrators MM1 and MM2, and the resultant signal indicates if the write and read clocks overlap at any clock cycles between the 120th and 600th cycles.

The resultant signal from the NAND gate NAND1 is output to a switching control unit 50 which comprises an OR gate OR1 and a flip-flop FF1. The OR gate OR1 inputs the signal output from the NAND gate NAND1 as well as the inverted signal $\overline{OE}$ and performs a logical OR operation. The resultant signal is output to a clear terminal CLR of the flip-flop FF1 as a clear signal. The flip-flop FF1 also inputs a vertical drive signal VD via its clock terminal CLK and receives a power supply voltage $V_{DD}$ via its input terminal D.

Based on the configuration above, the flip-flop FF1 outputs a control signal which indicates if the timing of the write and read clocks are potentially overlapping based on the output signal of the write/read clock comparator 40 and the inverted signal $\overline{OE}$. The output signal of the flip-flop FF1 is input by a switching unit 60 which comprises an AND gate AND1. The AND gate AND1 ANDs the output signal of the flip-flop FF1 and the write enable signal WE' output from the memory write control circuit 10, and the resultant signal is then output to the FIFO memory as a write enable signal WE.

The operation of the data collision avoidance circuit will now be described in detail with reference to FIG. 2. The data collision avoidance circuit inputs the write and read control odd/even field signals OE and FLDS to determine if the image data to be written to or read from the FIFO memory is in an odd field or and an even field. Specifically, the signals OE and FLDS are input by the signal inverting unit 20 and are respectively inverted into the inverted signals $\overline{OE}$ and $\overline{FLDS}$ as shown in (A) and (C) of FIG. 2. The signals $\overline{OE}$ and $\overline{FLDS}$ are then output to the differentiator 30 and are respectively differentiated into the differential signals TRG1 and TRG2. The differentiated signal TRG1 shown in (B) of FIG. 2 is applied to the first monostable multivibrator MM1 as a trigger signal TRG1, and the differentiated signal TRG2 shown in (D) of FIG. 2 is applied to the first monostable multivibrator MM1 as a trigger signal TRG2.

The resistor R5 and condenser C5 are coupled to the first monostable multivibrator MM1 and determine the pulse width of the signal output from the multivibrator MM1. Specifically, each time the either of the two trigger signals TRG1 or TRG2 is received, the first monostable multivibrator MM1 outputs the signal having the pulse width τ1 as shown in (E) of FIG. 2. The values of the resistor R5 and condenser C5 are selected such that the pulse width τ1 is less than 8.3 μs (i.e. 120×69.7 ns, where 120 is the number of the cycles of the clock signal and 69.7 ns is the period of one cycle of the clock signal).

The pulse signal output from the first monostable multivibrator MM1 is then input by the second monostable multivibrator MM2. The resistor R6 and the condenser C6 are coupled to the second monostable multivibrator MM2 and determine the pulse width of the output signal of the multivibrator MM2. In particular, at the falling edge of the pulse signal output from the first monostable multivibrator MM1, the multivibrator MM2 outputs a signal having a pulse width of τ2 as shown in (F) of FIG. 2. The values of the resistor R6 and condenser C6 are selected such that the pulse width τ2 is greater than 33 μs (i.e. (600–120)×69.7 ns, where (600–120) is the number of the cycles of the clock signal and 69.7 ns is the period of one cycle of the clock signal).

The pulse signals output from the first and second monostable multivibrators MM1 and MM2 are applied to the NAND gate NAND1. The NAND gate NAND1 NANDs the pulse signals and generates a resultant pulse signal as shown in (G) of FIG. 2.

As illustrated above, the write/read clock comparator 40 compares the write control odd/even field signal OE with the read control odd/even field signal FLDS to detect the instances in which the timing of the signals OE and FLDS overlap. As result, the pulse signal output from the NAND gate NAND1 indicates the range of cycles between the 120th and 600th cycles during which the write and read clocks may overlap.

The OR gate OR1 inputs the pulse signal output by the NAND gate NAND1 and the inverted write control odd/even field signal $\overline{OE}$ and outputs the resultant signal shown in (I) of FIG. 2. This signal is then input by the flip-flop FF1 as a clear signal. As shown in FIG. 2, the clear signal corresponds to the times at which write and read clocks overlap when the new image data to be written to the FIFO memory is in an odd field.

The flip-flop FF1 also receives the write control vertical drive signal VD as a clock signal ((H) of FIG. 2) and the power supply voltage $V_{DD}$ as an input signal D. Based on the above configuration, the flip-flop FF1 outputs a low signal when it receives the clear signal from the OR gate OR1 and subsequently outputs a high signal at the falling edge of the vertical drive signal VD. (See (J) of FIG. 2).

The inputs of the AND gate AND1 of the switching unit 60 respectively receive the signal output by the flip-flop FF1 and the write enable signal WE' output from the memory write control circuit 10. The AND gate AND1 then performs an AND operation on the two input signals, and the resultant signal is output to the FIFO memory as the write enable signal WE. In particular, if the output signal of the flip-flop FF1 is high, the write enable signal WE is identical to the write enable signal WE'. Consequently, the write enable signal WE is output by the switching unit 60 as a high signal except during the horizontal/vertical blanking interval. On the other hand, if the output signal of the flip-flop FF1 is low, the write enable signal WE output to the FIFO memory is low regardless of the write enable signal WE'. In this case, data is not written to the FIFO memory.

When the image signal is in the even field, the output of the flip-flop FF1 is always high as shown in (J) of FIG. 2. As a result, data is written to the FIFO memory in accordance with the write enable signal WE'. However, when the image signal is in the odd field, the output signal of the flip-flop FF1 can be either high or low. Consequently, data is only written into the FIFO memory only when the write and read clocks do not overlap.

The above described data collision avoidance circuit is capable of preventing the collision of new and old data during the writing and reading of data to and from the image memory. However, the circuit above comprises analog components such as resistors and capacitors, and thus, the reliability of the circuit is relatively low. In addition, since the circuit utilizes discrete resistors and capacitors, the size of the data collision avoidance circuit is relatively large.

SUMMARY OF THE INVENTION

It is therefore an object of the present invention to provide a data collision avoidance circuit used in an image processing FIFO memory.

It is another object of the present invention to provide a digital data collision avoidance circuit used in the image processing FIFO memory.

It is still another object of the present invention to provide a data collision avoidance circuit which occupies a relatively small space.

To achieve the above objects of the present invention, a data collision avoidance circuit utilized in a memory write control circuit for writing data into a FIFO memory of an image signal processing apparatus is provided. In one embodiment, the data collision avoidance circuit comprises a write enable signal generating means for generating write enable signal in response to a write control odd/even field signal to write the data into the FIFO memory; window pulse section set up means for generating a window pulse signal having a predetermined pulse width, wherein a time interval of the predetermined pulse width is greater than a time interval during which write and read clocks of the FIFO memory can potentially collide and wherein the window pulse signal is generated in response to a read control odd/even field signal; and control means for suppressing the write enable signal generated by the write enable signal generating means, wherein the write enable signal is suppressed in response to a predetermined edge of the write control odd/even field signal during the window pulse signal.

BRIEF DESCRIPTION OF THE DRAWINGS

In the detailed description of the preferred embodiments of the present invention presented below, reference is made to the accompanying drawings, in which.

DETAILED DESCRIPTION OF THE PREFERRED EMBODIMENT

Figure 1:
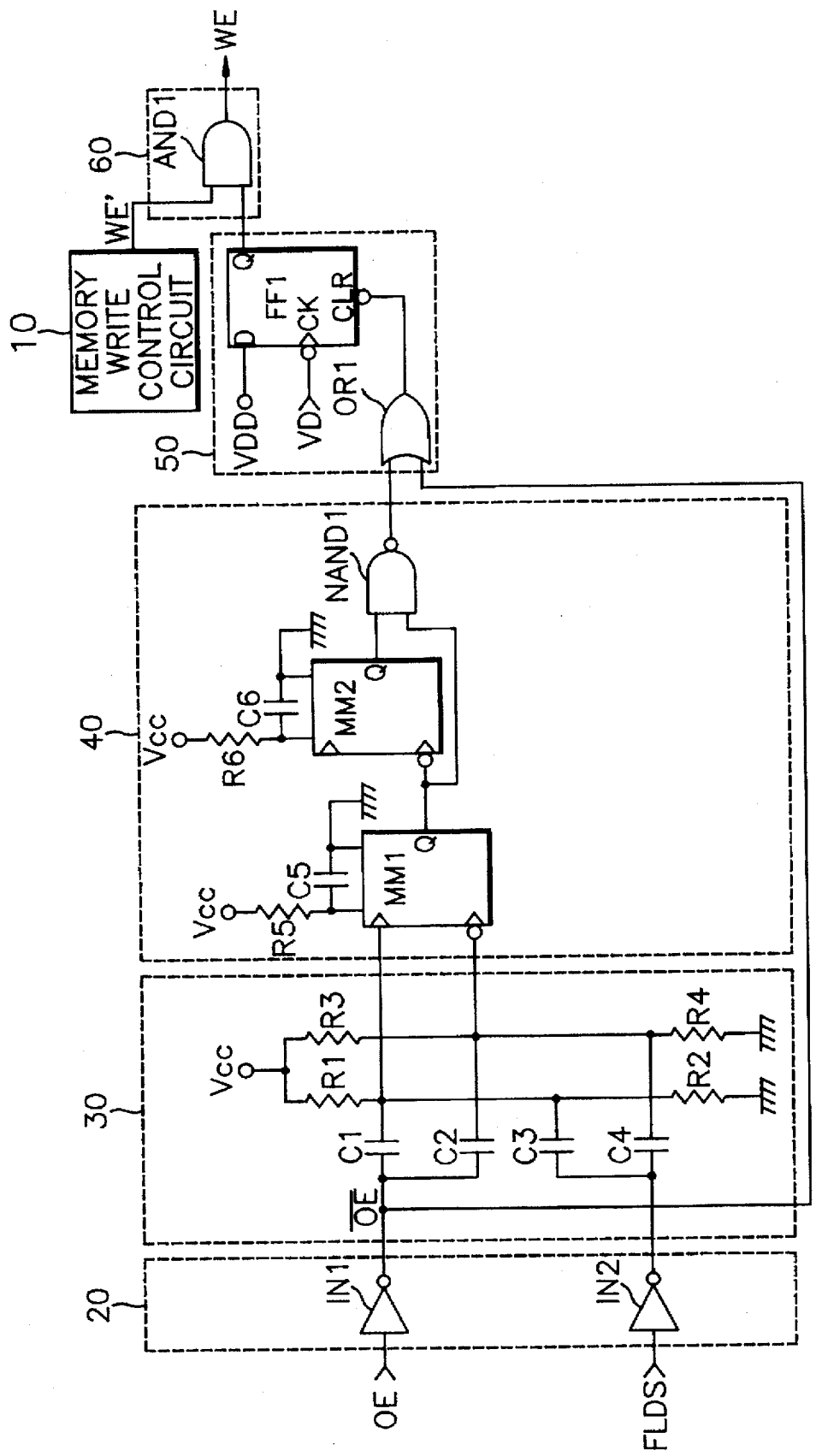
FIG. 1 shows a data collision avoidance circuit used in a FIFO memory.
Figure 3:
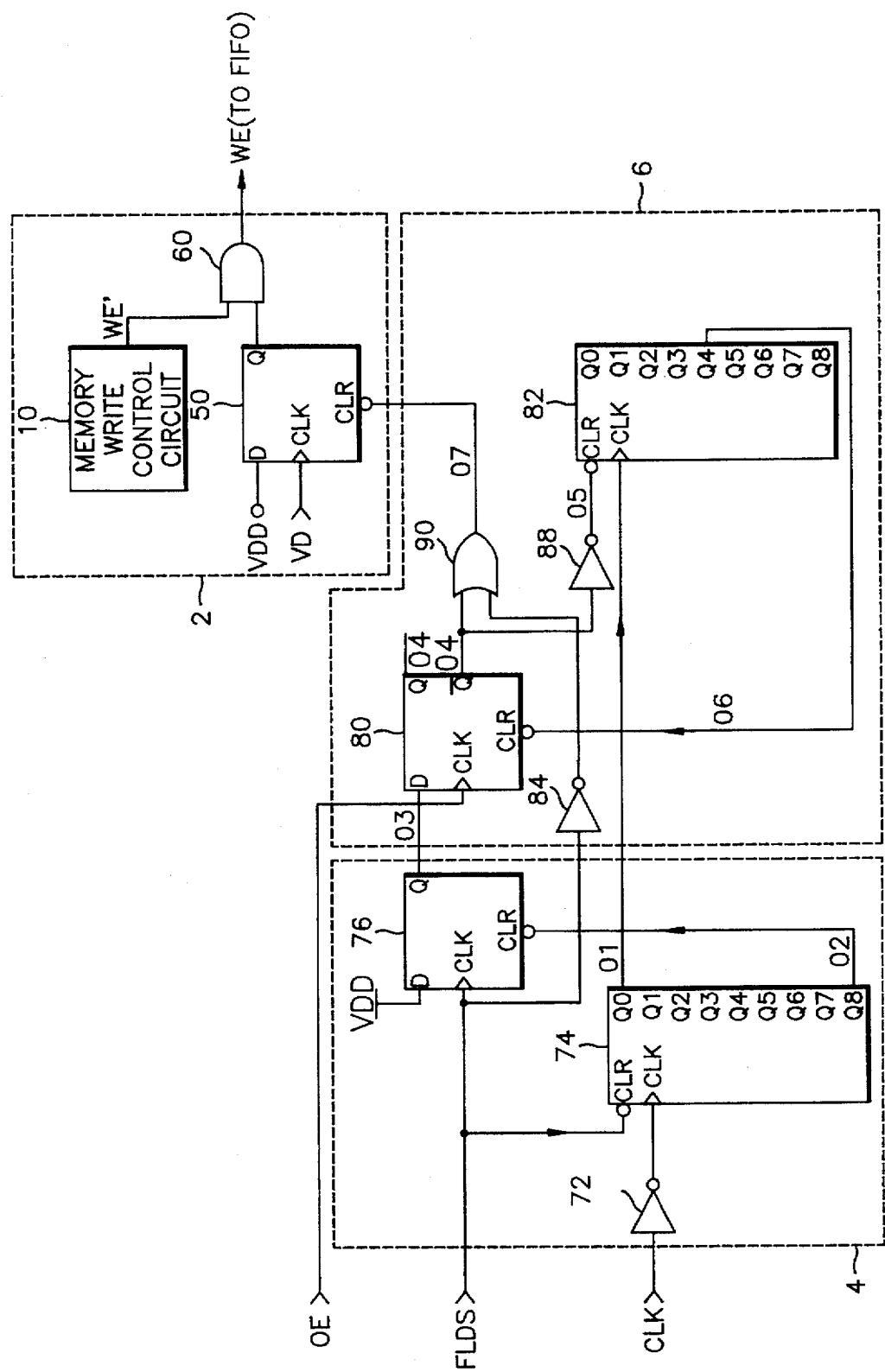
FIG. 3 shows a data collision avoidance circuit used in the FIFO memory according to the present invention.

FIG. 3 shows a data collision avoidance circuit according to a preferred embodiment of the present invention. As illustrated in the figure, the memory write control circuit 10, the D flip-flop 50, and the AND gate 60 have the same structure and function as those in FIG. 1. Therefore, in order to facilitate the description of the preferred embodiment, the memory write control circuit 10, D flip-flop 50, and the AND gate 60 will be collectively referred to as a write enable signal generating unit 2.

In addition to the write enable signal generating unit 2, the data collision avoidance circuit comprises a window pulse section set up unit 4 and a write enable signal control unit 6 which are each constructed of digital circuits. The window pulse section set up unit 4 generates a window pulse signal O3 such that the with of the pulse signal O3 has a duration which is greater than the predetermined range of clock cycles during which the write and read clocks can potentially overlap. The write enable signal control unit 6 determines the range of clock cycles during which the window pulse signal O3 has been generated and generates a corresponding clear signal O7. The clear signal O7 is output to the clear terminal CLR of the flip-flop 50 such that the write enable signal generating unit 2 outputs an appropriate write enable signal WE to prevent the collision of data read from and written to the FIFO memory.

The construction of the window pulse section set up unit 4 and the write enable signal control unit 6 will be described in greater detail below. The window pulse section set up unit 4 comprises a first counter 74 and a first flip-flop 76. The first counter 74 generates output signals O1 and O2 based on a clock terminal CLK which has been inverted via a first inverter 72. The first flip-flop 76 inputs a read control odd/even field signal FLDS via a clock terminal CLK, inputs the signal O2 via a clear terminal CLR, and outputs the corresponding window pulse signal O3.

The write enable signal control unit 6 comprises a second flip-flop 80, a second counter 82, a second inverter 84, a third inverter 88, and an OR gate 90. The second flip-flop 80 inputs the window pulse signal O3 from the first flip-flop 76 via an input terminal D and inputs the write control odd/even field signal OE via a clock terminal CLK. As a result, the second flip-flop 80 latches the pulse signal O3 based on the signal OE and outputs a corresponding signal O4.

The signal O4 is output to a clear terminal CLR of the second counter 82 via an inverter 88 to reset the second counter 82. In addition, the second counter 82 inputs the signal O1 from the first counter 74 as a clock signal via its clock terminal CLK. After receiving the inverted signal O4 (i.e. signal O5), the counter 82 is reset, begins counting in synchronicity with the signal O1, and subsequently generates a signal O6. The signal O6 is output to a clear terminal CLR of the second flip-flop 80 to clear the signal O4 output from the flip-flop 80.

The second inverter 84 inverts the read control odd/even field signal FLDS and outputs the inverted signal $\overline{FLDS}$ to the OR gate 90. Subsequently, the OR gate 90 ORs the output O4 of the second flip-flop 80 and the signal $\overline{FLDS}$ to generate a signal O7. The signal O7 is then output as a clear signal to the clear terminal CLR of the D flip-flop 50 of the write enable signal generating unit 2. Since the operation of the write enable signal generating unit 2 is the same as that of FIG. 1, it will not be described.

The operation of the embodiment above will now be described in detail with reference to FIG. 4. As illustrated above, the first counter 74 is reset by inputting the read control odd/even field signal FLDS via its clear terminal CLR and outputs the signals O1 and O2 based on the frequency of the clock signal CLK input via the clock terminal CLK. In the present embodiment, the clock signal CLK has a frequency of 3.58 MHz and a period of 280 nsec. Consequently, the signal O1 is a square wave having a period equal to 280 ns (i.e. 280 ns×2⁰), and the signal O2 is a square wave having a period equal to 71 µs (i.e. 280 ns×2⁸). The signal O1 is input by the second counter 82 via the clock terminal CLK, and the signal O2 is input by the first flip-flop 76 via the clear terminal CLR.

The first flip-flop 76 has an input terminal D and a clock terminal CLK which respectively input the power supply $V_{DD}$ and the read control odd/even field signal FLDS. As a result, the window pulse signal O3 output by the flip-flop 76 becomes high in response to the rising edge of the signal FLDS. However, since the signal O2 is input to the clear terminal CLR of the flip-flop 76 71 µs after the rising edge of the signal FLDS, the window pulse signal O3 has a pulse width of 71 µs as shown in FIG. 4.

The pulse width of the window pulse signal O3 encompasses the predetermined range of clock cycles (i.e the 120th to 600th clock cycles) during which the write and read clocks of the FIFO memory may collide. Since the window pulse signal O3 is generated in accordance with the rising edge of the read control odd/even field signal FLDS, the signal O3 indicates when the read and write clocks to be applied to the FIFO memory are in a collision avoidance mode.

Figure 4:
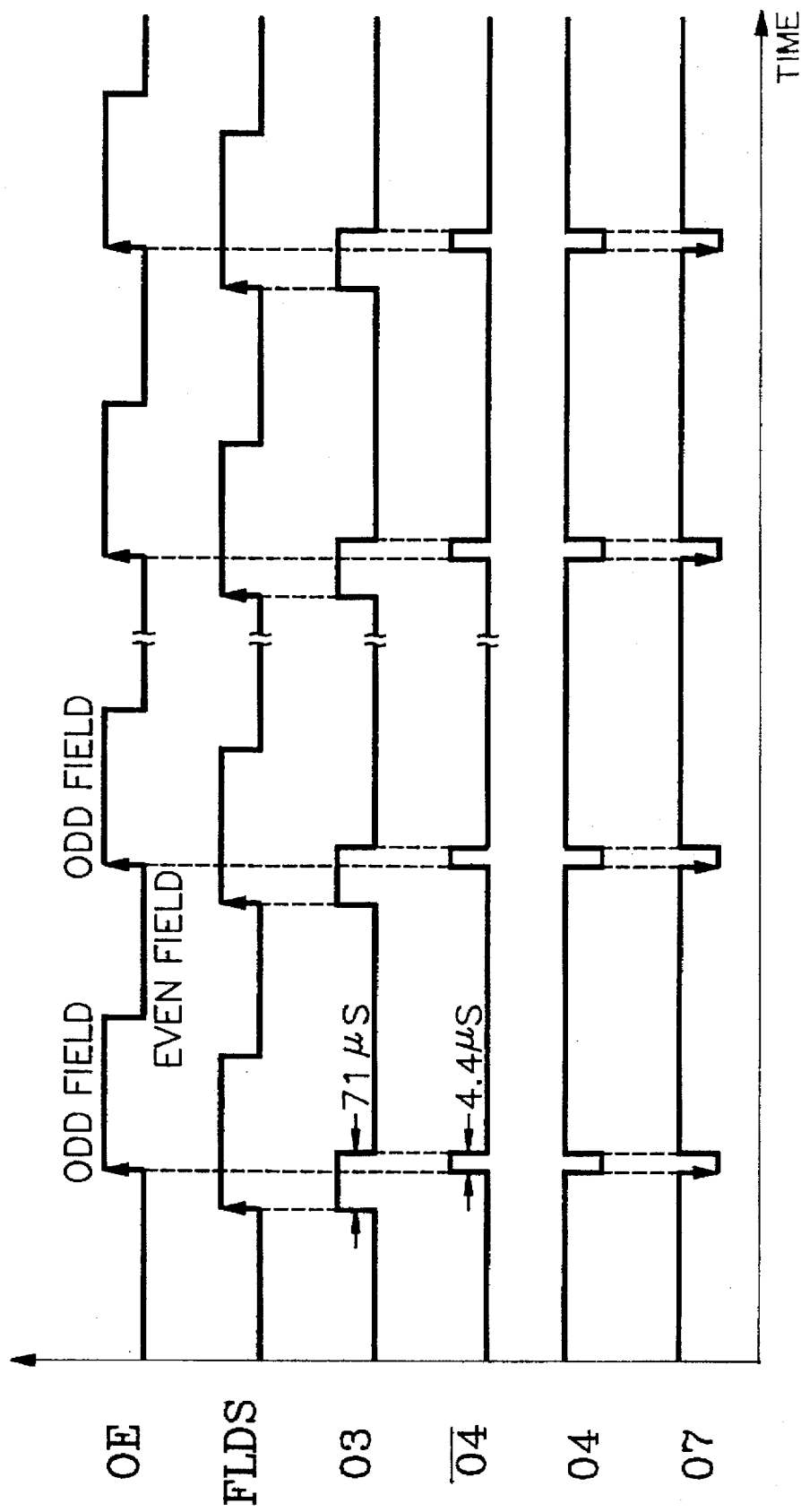
FIG. 4 is a wave form chart showing the I/O signals of respective components in FIG. 3.

The window pulse signal O3 is input by the second flip-flop 80, and the second flip-flop 80 latches the window pulse signal O3 in response to the rising edge of the write control odd/even field signal OE to produce a signal O4 as shown in FIG. 4. Once the flip-flop 80 outputs the signal O4, the signal O4 is inverted by the third inverter 88 into an inverted signal O5, and the signal O5 resets the second counter 82. In addition, the second counter inputs the signal O1 from the first counter 74 via its clock terminal CLK. As a result, the second counter 82 incrementally counts in synchronicity with the signal O1.

Since the period of the signal O1 is 280 nsec, the second counter 82 outputs the signal O6 4.4 µs (280 ns×2⁴) after it has been reset by the signal O5. In other words, the second counter 82 outputs the signal O6 approximately 4.4 µs after the rising edge of the signal OE latches the window pulse signal O3 as the output signal O4 of the second flip-flop 80. Consequently, since the signal O6 is output to the clear terminal CLR of the flip-flop 80, the signals O4 and O4 have a pulse width equal to 4.4 µs as shown in FIG. 4.

Figure 2:
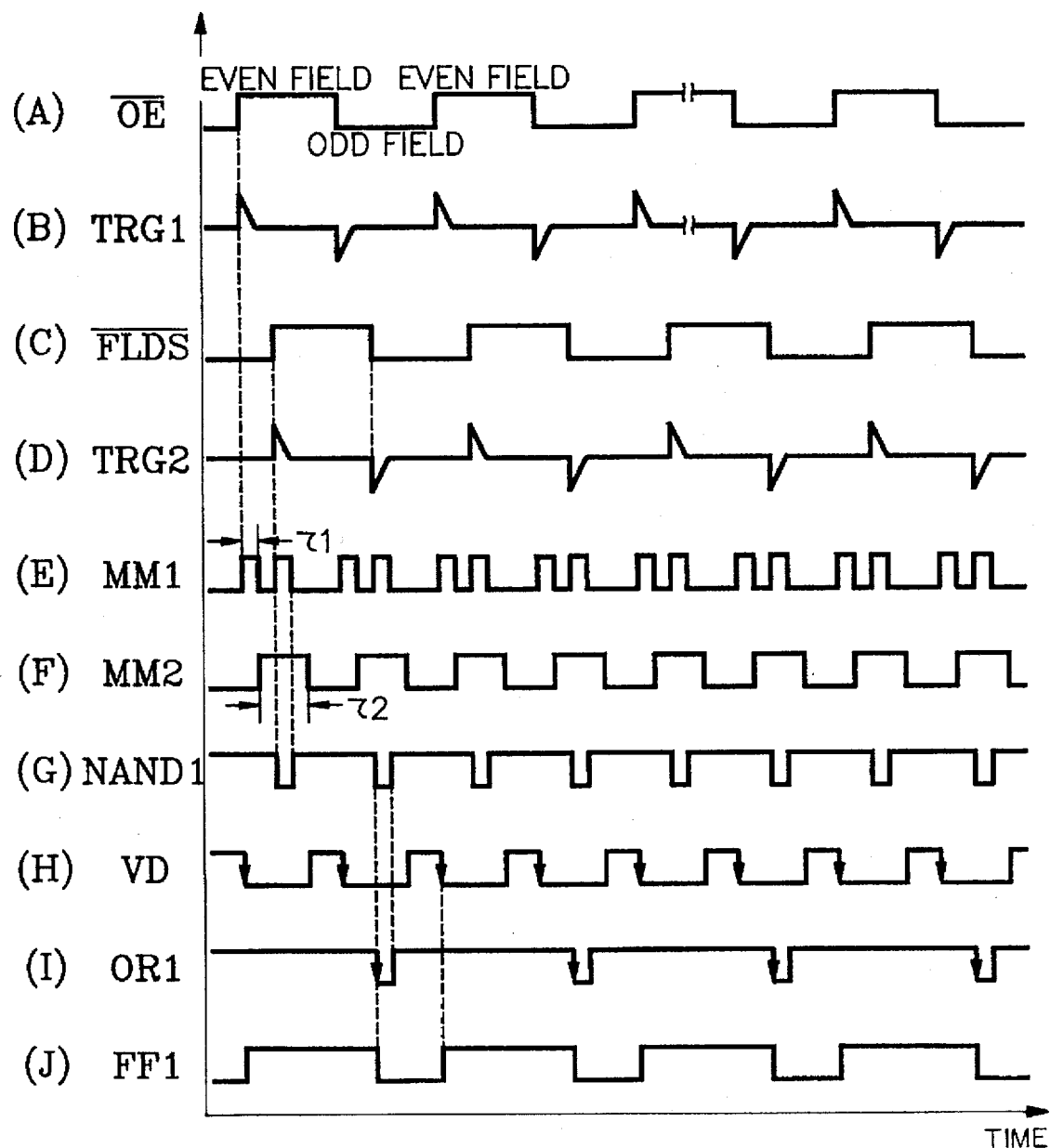
FIG. 2 is a wave form chart showing the I/O signals of respective components in FIG. 1.

The output signal O4 of the second flip-flop 80 is also output to one input of the OR gate 90. In addition, the OR gate 90 also inputs the inverted read control odd/even field signal $\overline{FLDS}$ via the second inverter 84. Subsequently, the OR gate ORs these two input signals and generates the clear signal O7 which is output to the clear terminal CLR of the D flip-flop 50. The clear signal O7 (shown in FIG. 4) is the same as the signal illustrated in (I) of FIG. 2. The remaining operations of the flip-flop 50, memory write control circuit 10, and the AND gate 60 are the same as those of the circuit as described above in the background section of the specification.

As previously illustrated, the window pulse signal O3 having a pulse width of 71 µs is generated upon the rising edge of the read control signal FLDS. As a result, the circuit is placed in a collision avoidance mode. Consequently, if the write control odd/even field signal OE instructs new data to be written to the FIFO memory during the generation of the window pulse signal O3, the data collision avoidance circuit does not output a write enable signal WE in response to the signal OE. Specifically, in response to the rising edge of the signal OE, a low signal O4 having a pulse width of 4.4 µs is output to the clear terminal CLR of the D flip-flop 50 of write enable signal generating unit 2. Thus, the flip-flop 50 outputs a low signal to the AND gate 60, thereby causing the write enable generating unit 2 to output a low write enable signal WE. Accordingly, the present invention is capable of preventing data collision during the writing and reading of image memory data to and from the FIFO memory by only enabling the data to be read from the FIFO memory during the time that the read and write clocks are overlapped.

As described above, the above embodiment of the digital data collision avoidance circuit is capable of preventing the collision of data without using analog components. Consequently, the reliability of the data collision avoidance circuit is significantly increased, and the size of the circuit can be substantially reduced by incorporating the digital circuit in a gate array.

What is claimed:

1. A data collision avoidance circuit utilized in a memory write control circuit for writing data into a FIFO memory of an image signal processing apparatus, said data collision avoidance circuit comprising:

write enable signal generating means for generating a write enable signal in response to a write control odd/even field signal to write said data into said FIFO memory;

window pulse section set up means for generating a window pulse signal having a predetermined pulse width, wherein a time interval of said predetermined pulse width is greater than a time interval during which write and read clocks of said FIFO memory can potentially collide and wherein said window pulse signal is generated in response to a read control odd/even field signal; and control means for suppressing said write enable signal in response to a predetermined edge of said write control odd/even field signal during said window pulse signal.

2. The data collision avoidance circuit according to claim 1, wherein said window pulse section set up means comprises:

a first counting unit, wherein said first counting unit is reset by a predetermined edge of said read control odd/even field signal and incrementally counts according to a predetermined clock and wherein said first counting unit outputs first and second counting signals; and a window pulse generating unit, wherein said window pulse generating unit generates said window pulse signal and wherein said time interval of said predetermined pulse width is defined from said predetermined edge of said read control odd/even field signal to a time that said first counting signal is generated.

3. The data collision avoidance circuit according to claim 2, wherein said time interval of said predetermined pulse width is about 71 μs.

4. The data collision avoidance circuit according to claim 3, wherein said control means comprises:

a latch unit, wherein said latch unit generates a control pulse signal by latching said window pulse signal in response to said write control odd/even field signal and clearing said latched signal in response to a third counting signal;

a second counting unit, wherein said second counting unit begins counting in synchronicity with said second counting signal of said first counting unit when said control pulse signal is generated and then outputs said third counting signal after a certain period of time; and a logic operating unit, wherein said logic operating unit performs a logic operation on said control pulse signal and said read control odd/even field signal.

5. The data collision avoidance circuit according to claim 4, wherein said certain period of time is about 4.4 μs.

6. The data collision avoidance circuit according to claim 2, wherein said control means comprises:

a latch unit, wherein said latch unit generates a control pulse signal by latching said window pulse signal in response to said write control odd/even field signal to produce a latched signal and clearing said latched signal in response to a third counting signal;

a second counting unit, wherein said second counting unit begins counting in synchronicity with said second counting signal of said first counting unit when said control pulse signal is generated and then outputs said third counting signal after a certain period of time; and a logic operating unit, wherein said logic operating unit performs a logic operation on said control pulse signal and said read control odd/even field signal.

7. The data collision avoidance circuit according to claim 6, wherein said certain period of time is about 4.4 μs.

8. A data collision avoidance circuit utilized in a memory write control circuit for writing data into a FIFO memory of an image signal processing apparatus, said data collision avoidance circuit comprising:

write enable signal generating means for generating a write enable signal in response to a write control odd/even field signal to write data into said FIFO memory;

a first counting unit, wherein said first counting unit is reset by a predetermined edge of a read control odd/even field signal and incrementally counts according to a predetermined clock and wherein said first counting unit outputs first and second counting signals;

a window pulse generating unit, wherein said window pulse generating unit generates a window pulse signal having a predetermined pulse width in response to a predetermined edge of said read control odd/even field signal and wherein a time interval of said predetermined pulse width is defined from said predetermined edge of said read control odd/even field signal to a time that said first counting signal is generated;

a latch unit, wherein said latch unit generates a control pulse signal by latching said window pulse signal in response to said write control odd/even field signal to produce a latched signal and clearing said latched signal in response to a third counting signal;

a second counting unit, wherein said second counting unit begins counting in synchronicity with said second counting signal of said first counting unit when said control pulse signal is generated and then outputs said third counting signal after a certain period of time; and a logic operating unit, wherein said logic operating unit performs a logic operation on said control pulse signal and said read control odd/even field signal and then outputs a resultant signal of said logic operation to said write enable signal generating means.

9. The data collision avoidance circuit according to claim 8, wherein said time interval of said predetermined pulse width is about 71 μs.

10. The data collision avoidance circuit according to claim 8, wherein said certain period of time is about 4.4 μs.

11. A data collision avoidance circuit utilized in a memory write control circuit for writing data into a FIFO memory of an image signal processing apparatus, said data collision avoidance circuit comprising:

a write enable signal generating circuit adapted to generate a write enable signal in response to a write control odd/even field signal to write said data into said FIFO memory;

a window pulse section set up circuit adapted to generate a window pulse signal having a predetermined pulse width, wherein a time interval of said predetermined pulse width is greater than a time interval during which write and read clocks of said FIFO memory can potentially collide and wherein said window pulse signal is generated in response to a read control odd/even field signal; and a controller adapted to suppress said write enable signal in response to said write control odd/even field signal during said window pulse signal.

12. The data collision avoidance circuit according to claim 11, wherein said window pulse section set up circuit comprises:

- a first counting unit, wherein said first counting unit is reset by said read control odd/even field signal and incrementally counts according to a predetermined clock and wherein said first counting unit outputs a first counting signal; and
- a window pulse generating unit, wherein said window pulse generating unit generates said window pulse signal.

13. The data collision avoidance circuit according to claim 12, wherein said time interval of said predetermined pulse width is defined from a predetermined time at which said first counting unit is reset by said read control odd/even field signal to a time that said first counting signal is generated.

14. The data collision avoidance circuit according to claim 13, wherein said predetermined time is defined by a predetermined edge of said read control odd/even field signal and said time that said first counting signal is generated.

15. The data collision avoidance circuit according to claim 14, wherein said time interval of said predetermined pulse width is about 71 µs.

16. The data collision avoidance circuit according to claim 12, wherein said controller comprises:

- a latch unit, wherein said latch unit generates a control pulse signal by latching said window pulse signal in response to said write control odd/even field signal to produce a latched signal and clearing said latched signal in response to a third counting signal;
- a second counting unit, wherein said second counting unit begins counting in synchronicity with a second counting signal output from said first counting unit when said control pulse signal is generated and then outputs said third counting signal after a certain period of time; and
- a logic operating unit, wherein said logic operating unit performs a logic operation on said control pulse signal and said read control odd/even field signal.

17. The data collision avoidance circuit according to claim 16, wherein said certain period of time is about 4.4 µs.

18. The data collision avoidance circuit according to claim 11, wherein said controller suppresses said write enable signal in response to a predetermined edge of said write control odd/even field signal.

19. The data collision avoidance circuit according to claim 16, wherein said first counting signal has a first period greater than a second period of said second counting signal.

* * * * *